Feb. 10, 1942. W. A. JACK, 3D 2,272,639
VIBRATION ISOLATING MOUNTING
Filed March 26, 1938 2 Sheets-Sheet 1
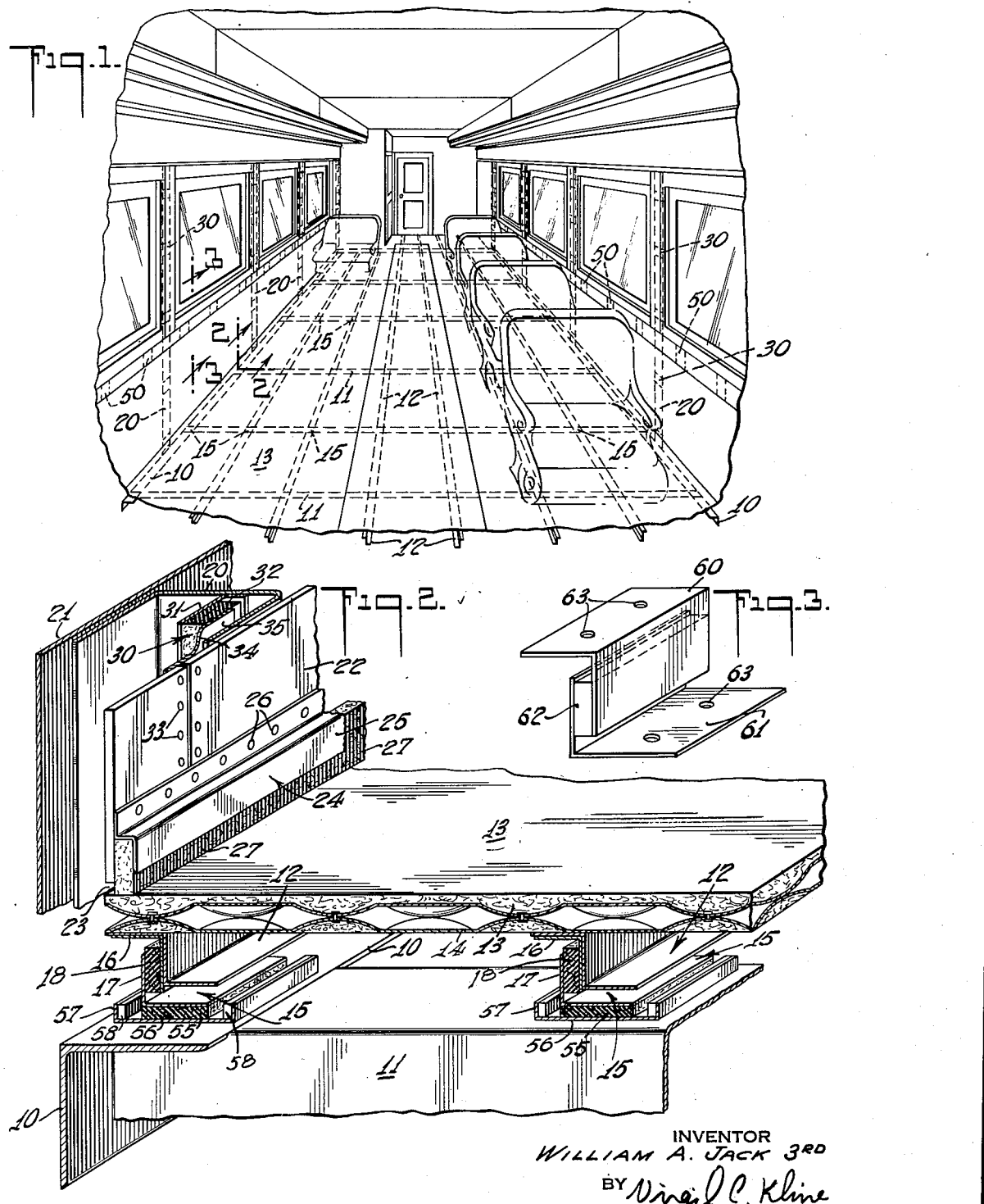
INVENTOR
WILLIAM A. JACK 3RD
BY Virgil C. Kline
ATTORNEY

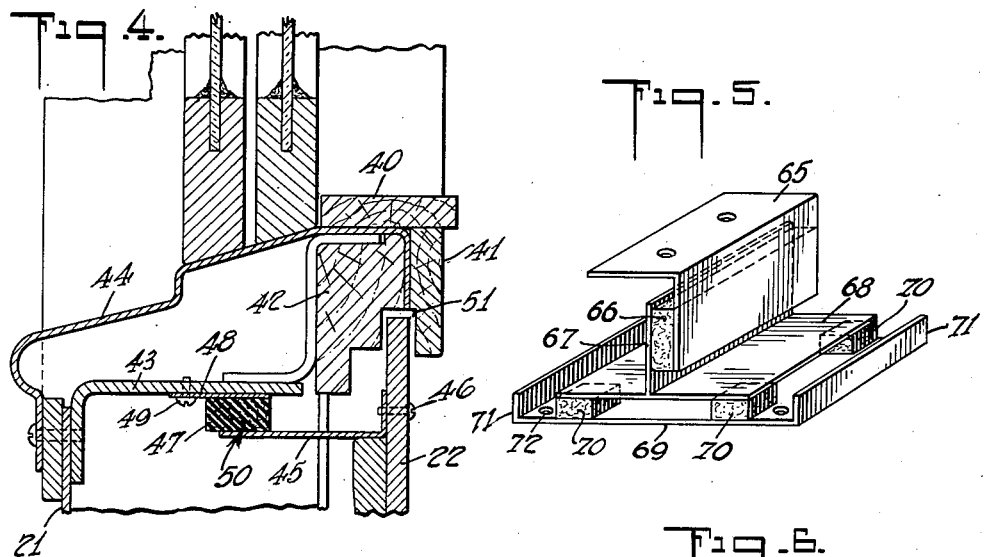
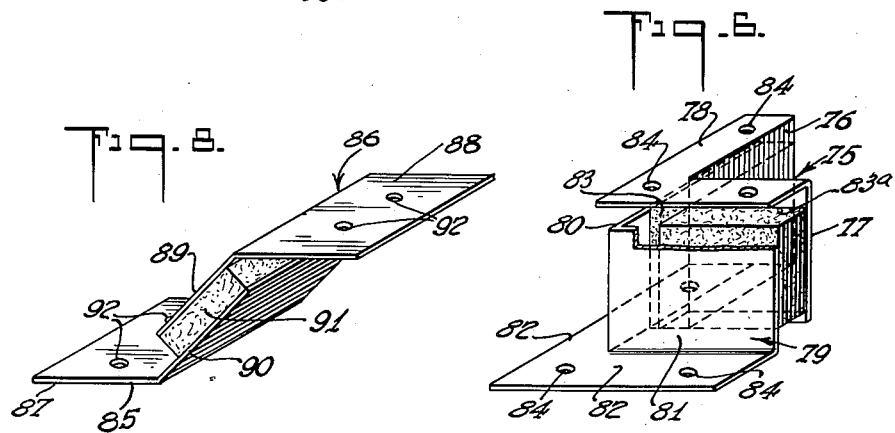
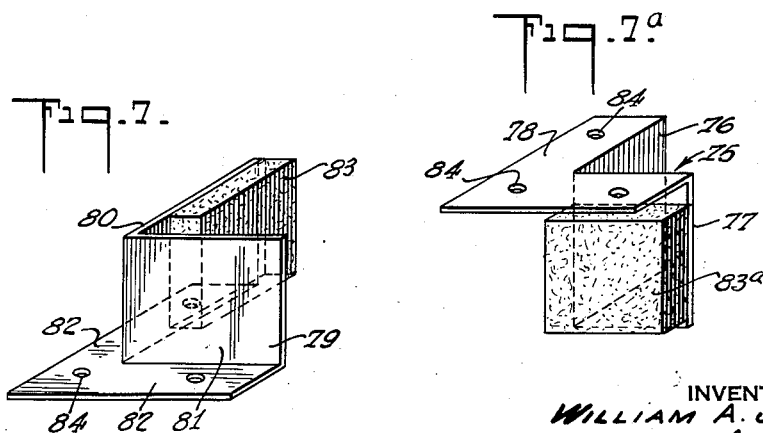

Patented Feb. 10, 1942

2,272,639

UNITED STATES PATENT OFFICE 2,272,639

VIBRATION ISOLATING MOUNTING

William A. Jack, 3rd, North Plainfield, N. J., assignor to Johns-Manville Corporation, New York, N. Y., a corporation of New York Application March 26, 1938, Serial No. 198,215

5 Claims. (Cl. 105—422)

The present invention relates to vibration isolating or damping mountings for preventing the transmission of vibrations from a vibrating body to a body supported on it or to the body from which it is supported, as the case may be.

The prevention of the transmission of vibrations in either direction between supporting and supported bodies has presented a problem, the adequate solution of which has long been sought. The numerous proposals heretofore made have included the interposing of materials such springs, cork, felt and rubber, and, in some instances combinations of these materials between the bodies. None of the prior proposed structures, however, have provided the high compliance necessary for satisfactory functioning of the device, and particularly, they have failed in those cases where the vibrational movements set up have components in more than one plane. Thus, in motors and the like in general the mode of vibration is elliptical and resolves into at least two planes. Similarly, the interior floors of railway cars and similar structures are subject to modes of vibrations in both the horizontal and vertical planes. To obtain adequate isolation of vibrations in structures of these types, the isolating device must exhibit high compliance to all modes of vibrations, a desideratum which has not been approached by the prior proposed constructions.

It is, accordingly, a primary object of the present invention to provide improved vibration isolating and damping devices which will have high compliance to vibrations having components in two or more planes.

A further object of the present invention is to provide vibration isolating devices, as referred to above, in which rubber or similar materials are employed in shear compliance to the predominant modes of vibrations of the vibratory structure. It has been determined that by supporting a vibratory body, for example, by rubber blocks or the like, so loaded that the principal strain on the supporting material is in shear, high compliance of the rubber to the vibrations is obtained, and hence, the most efficient isolating results. The use of this principle in a new and improved manner is a feature of the present invention.

The present invention is directed particularly to vibration isolating devices for the support of railway car floors, walls and the like.

At the present time, it is standard railroad practice to build up a floor of magnesite, cork or similar materials upon truss plate or chanarch. The floor rests upon and is rigidly connected to lengthwise-extending channels or Z-bars, the latter, in turn, being carried by and rigidly connected to a frame comprising transversely-extending members or cross bearers supported by longitudinally-extending beam members. The walls of the car are also normally carried by the supporting frame.

The shocks to which the car wheels are subjected and the stresses that develop therein set up mechanical vibrations which, due to the rigid manner in which the several portions of the structure are secured, are transferred to the floor and also to the car walls. This results particularly in an unpleasant floor vibration, which is of itself a source of annoyance to passengers. The vibration of the floor also generates airborne sounds which comprise an additional detriment to the passengers' comfort.

It is, accordingly, a further object of the present invention to provide vibration isolating constructions of the type previously referred to for isolating a railway car floor, and the interior walls if desired, in such a manner that the shocks to which the wheels of the car are subjected are not transmitted to any substantial extent to the floor or inner wall structure.

For the attainment of the foregoing object, it has been determined that the vibration isolating floor support must, in addition to its vibration damping function, exert sufficient lateral stability in a horizontal plane to prevent undue lateral movement of the floor, and at the same time, be compliant to horizontal vibrations; it must not rupture in case of accident; it must be of such construction as to limit excessive movement of the floor in all directions when the car is subjected to sudden jolts; the damping ability of the device must be such as to substantially prevent resonant bouncing and to damp out free oscillations after sudden jolting of the car; and the damping support must not raise the original floor line to any substantial extent.

A further object of the present invention is to devise vibration isolating units to be employed in conjunction particularly with railway car floors which will meet all of the above-stated requirements.

A further object of the invention is to provide a railway car construction in which the walls and floors will be substantially free from vibrational movements.

My invention will be more fully understood and further objects and advantages thereof will become apparent when reference is made to the more detailed description thereof which is to follow and to the accompanying drawings in which Fig. 1 is a perspective view of a railway car interior illustrating an arrangement of vibration isolators in accordance with the present invention;

Fig. 2 is a sectional perspective view taken on the line 2—2 of Fig. 1 illustrating the application of vibration isolating means in both car floor and wall construction in accordance with the invention;

Fig. 3 is a perspective view of a modified form of vibration isolator;

Fig. 4 is a sectional view taken on the line 3—3 of Fig. 1;

Fig. 5 is a perspective view illustrating a modified form of vibration isolator;

Fig. 6 is a perspective view illustrating a further modified form of vibration isolator;

Fig. 7 is a detail view depicting a portion of the device of Fig. 6;

Fig. 7a is a detail view depicting a second portion of the device of Fig. 6; and Fig. 8 is a perspective view of a further modified form of the vibration isolator.

Referring now to the drawings, and particularly to Figs. 1, 2, and 4, a railway car construction embodying vibration isolating devices in accordance with the present invention, is illustrated. In the construction shown in Figs. 1, 2, and 4, the primary floor-supporting structure comprises, in accordance with conventional practice, longitudinally-extending side rails or beams 10, cross bearers 11 secured at suitable intervals to said beams, longitudinally-extending Z-bars 12, and a self-sustaining relatively rigid floor structure 13. The floor structure may comprise magnesite, cork, or a similar composition material resting upon a plate structure or chanarch 14. However, any other suitable relatively rigid, self-sustaining flooring may be employed, the specific type disclosed in Fig. 2 being shown for the purposes of illustration only.

In accordance with the present invention, the Z-bars 12 are, in each instance, separated from the cross bearers 11 or rails 10 by vibration isolating devices indicated generally at 15. The devices 15 will be specifically described below in their preferred and alternative embodiments, but, briefly stated, comprise metal angle members 16 and 17 supported from the floor structure 13 and cross bearers 11 or rails 10, respectively. The angle members have parallel vertical opposed flanges secured to opposite faces of a block of rubber or the like 18, whereby the load of the floor is supported from the cross bearers by the rubber in shear. As will be later more fully pointed out, the vibration isolators, as illustrated in Fig. 2, also include rubber blocks so supported as to have shear compliance to all horizontal vibrational movements, the latter blocks carrying the load of the floor in compression. The isolators 15 are preferably located at each intersection of the Z-bars 12 and cross bearers as illustrated in Fig. 1. The number of isolators required will be dependent, of course, upon the maximum load which each is constructed to carry, and it follows that by the provision of isolators of suitable capactiy, the number employed may be varied from that shown in Fig. 1. However, it is found to be preferable to distribute them in the manner indicated, whereby numerous supporting points are provided throughout the floor.

The wall structure of the railway car, in accordance with conventional practice, comprises column members 20 (see particularly Fig. 2), outer sheathing 21 and interior finish wall panels 22. In accordance with the invention, the lower edges of the inner panels 22 are spaced from the floor structure 13 as indicated at 23 to prevent possible vibrations of the wall panels from being directly transferred to the floor and hence, at least partially, destroying the isolation of the floor provided by the devices 15. Suitable means 24 are provided for closing the space 23, the means having the property of absorbing relative vibrational movements of the wall and floor. The means 24, as illustrated, may comprise a housing strip 25 secured by screws, rivets, or the like 26 to the wall panels. Mounted in the housing 25 is a strip 27 of a suitably soft, readily-compressive material, such as sponge rubber, or the like having its lower edge resting against the floor. Relative vibrational movements of the floor and wall will be absorbed by the soft compressive strips 27. The means 24 preferably extends the full length of the car. Similarly, the floor structure may be spaced from other parts of the car conventionally resting upon the same, such as posts, wainscotings, bulkheads, door sills, and the like, and such spaces may be closed by sponge rubber, or other suitably compressible material.

Isolators may also be employed between the outer walls or wall supporting structure and the interior wall panels 22. The type of isolator and the arrangement thereof for this purpose are most clearly shown in Figs. 2 and 4. Thus, as illustrated in Fig. 2, the wall panels 22 are supported from the columns 20 by vibration isolators illustrated generally at 30. The isolators 30 preferably comprise an angle member 31 having one flange riveted or otherwise secured to the column 20 and its other flange secured by vulcanization or the like to one face of a block of rubber or similar material 32. Secured to the inner wall panels 22 by suitable means, such as the rivets 33, is a plate 34. The plate 34 has an offset portion 35 spaced from the wall panels 22 and secured preferably by vulcanization to the opposite face of the rubber block 32. As will be readily understood, the entire support of the wall panels 22 is provided by the rubber block 32 stressed in shear. The members 30 may extend continuously for the full height of the car wall, or if desired, they may be constructed in short suitably spaced segments.

Fig. 4 discloses the adaptation of the isolating principle for the support of the inner wall panels 22 adjacent the window ledges. In said figure, the window casing is shown as comprising a sill 40 rigidly supported by members 41, 42, 43, and 44 from the outer wall sheathing 21. In accordance with the invention, the inner wall 22 has connected thereto an angle member 45 by suitable means, such as a screw 46. The outwardly extending flange of the angle member is secured to one face of a rubber block 47 which has its opposite face secured to a plate 48. The plate 48 is, in turn, mounted on the member 43 by means of suitable screws 49, or the like. Thus, the members 45, 47, and 48 comprise a vibration isolator indicated in its entirety at 50.

As indicated at 51, a space is provided between the upper edge of the wall panel 22 and the adjacent window ledge structure. Hence, horizontal vibrational movements of the outer wall and of the window ledge will be isolated by the rubber block 50, stressed in shear, the loose fitting of the panels 22 with respect to the ledge preventing any direct transference of the vibrations to the panels 22 by the ledge structure.

It will be understood that it is within the scope of the invention to employ vibration isolators, preferably employing rubber in shear stress, between the inner and supporting ceiling structures. It has been determined, however, that the primary sources of annoyance to the passengers is by reason of the vibration of the floor, and, to some extent, the walls of the car, the car ceiling providing a minimum of such effects. Hence, isolation of the ceiling structure is not of primary importance, but may be employed where complete elimination of any vibrational frequencies in the interior structure of the car is desired.

Referring now specifically to Figs. 2, 3, and 5 to 8, inclusive, several embodiments of the vibration isolators are illustrated, particularly suitable for the mounting of railway car floors.

Referring again particularly to Fig. 2, the isolator 15, in the specific embodiment illustrated comprises angle plates 16 and 17 and rubber block 18 secured to vertical, spaced parallel flanges of said angle members preferably by vulcanization. These elements form the primary portion of the isolator 15. In addition, the isolator includes a rubber block 55 interposed between the horizontal flange of angle member 17 and a plate member 56, the latter being secured to the support, in this instance the side rail 10 or cross bearer 11, by suitable means, such as bolts, rivets, or the like. The rubber block 55 is secured to the plate 56 and to the horizontal flange of the angle member 17. Plate member 56 is provided with upright flanges 57 having secured thereto rubber or other resilient bumper elements 58. The bumpers 58 may be secured to the flanges in any suitable manner, for example, by cementing the same thereto.

The isolators, illustrated at 15 in Fig. 2 and specifically described above, provide high compliance to vibrational movements, both in the vertical and horizontal directions. Thus, as will readily be observed, horizontal vibrational movements in a direction longitudinally of the car will stress both the rubber blocks 18 and 55 in shear. Horizontal vibrational movements transversely of the car and vertical vibrational movements will stress rubber blocks 55 and 18, respectively, in shear. Hence, irrespective of the direction of the vibrational movements, transference of the same through the isolator will, in each instance, be prevented by shear compliance of one or both of the rubber blocks 18 and 55. The bumpers 58 secured to the flanges 57 of plate member 56 serve to cushion the impact of the plate member 15 thereagainst, in the event of excessive vibration, the cushions 58 and flanges 57 thus serving as resilient snubbing means.

It has heretofore been pointed out that the high compliance to vibrational movements of rubber and similar materials in shear, as compared to the compliance of rubber, felt, or other materials in compression, enables rubber, when so stressed, to exhibit a vibration isolating function to a high degree. The isolator 15 adopts this principle in a highly successful manner. By reason of the compact construction provided, the supported construction, whether it may be a car floor or other device, is not raised an undesirable extent.

In Fig. 3 there is disclosed a somewhat simpler form of the isolator particularly suitable for use when the horizontal vibrational movements are, for the most part, in substantially but one direction. This device comprises angle members 60 and 61 having vertical flanges lying in opposed spaced relationship. Secured to the opposed faces of the vertical flanges is a block of rubber or similar material 62. In this instance, the horizontal flanges of the angle members 60 and 61 are secured directly to the supported and supporting structures, respectively, no horizontal block of rubber being employed. Suitable apertures may be provided in the horizontal flanges of the angle members, as indicated at 63, for the accommodation of fastening elements, such as screws, bolts, or the like.

Fig. 5 illustrates a modified form of the invention isolator disclosed in Fig. 2. In this form of the device, an angle plate 65 is employed having its vertical flange secured to the rubber or similar body 66. The lower plate in this instance is formed of inverted T-shape, the vertical leg 67 of the T lying in spaced parallel relationship to the vertical flange of the angle plate 65 and being secured to the opposite face of the rubber block 66. The base 68 of the T-member is supported at its four corners from a base plate 69 by blocks of rubber or like material 70. The rubber blocks 70 may be made as small as possible consistent with the load-bearing requirements, whereby exceptionally high compliance is obtained to horizontal vibrational shearing stresses on these blocks. At the same time, this form of isolator provides a greater degree of stability than the form disclosed in Fig. 2, due to the fact that the rubber blocks 70 are equally spaced at a substantial distance from each side of the load axis. The base plate 69 is preferably provided with flanges 71 to form stops in the event of undue horizontal movement of the plate 68. As in the embodiment of Fig. 2, the flanges 71 may be provided with flexible strips of rubber, felt, or the like (not shown) to permit the snubbing action of the flanges 71 to take place without accompanying jars. Suitable apertures 72 may be preferably provided in the base plate for the reception of fastening means.

In the form of isolator illustrated in Figs. 6, 7, and 7a, two rubber blocks are supported in vertical planes at right angles to one another, whereby both blocks are stressed in shear by vertical movements, and one or the other of the blocks is stressed in shear by horizontal movements, of the supported or supporting structure. This form of the device comprises a member 75 having vertical legs 76 and 77 disposed at an angle of substantially 90 degrees to each other. Each leg is provided with a horizontal flange 78 at its upper edge. A similar member 79 is provided having vertical legs 80 and 81 lying in parallel spaced relationship to the legs 76 and 77, respectively, of member 75. The legs 80 and 81 are provided with horizontal flanges 82 at their lower edges. Between the vertical, opposed legs of angle members 75 and 79, blocks of rubber or the like 83 and 83A are located secured to said opposed legs. The horizontal flanges of the angle members preferably include suitable openings, as indicated at 84, for the passage of screws, bolts, or other securing means.

Referring now to Fig. 8, a further form of isolator is illustrated. The isolator includes plates 85 and 86 having horizontal base portions 87 and 88, respectively, lying in spaced parallel planes and spaced, opposed parallel portions 89 and 90, respectively, suitably extending at an angle of substantially 135° to their respective base portions. Between the opposed portions of the plates, a block of rubber or the like 91 is mounted, the block preferably having its faces secured to the portions 89 and 90. As in the other forms of the isolator, apertures 92 are preferably provided in the horizontal portions of the plates to permit the same to be secured by bolts or the like to the supported and supporting structures.

In this form of the device, the shear axis of the rubber block is at an angle to the major axis of the vertical system. Hence, horizontal vibrations parallel to the longitudinal dimension of the isolator are opposed by a higher compliance than in the case illustrated in Fig. 3, due to the shear component of the stresses in the rubber block. The angle between the legs of the plate members 85 and 86 has been stated to suitably approximate 135°, but it will be understood that the invention is not limited thereto, and that the angle may be selected so as to present the greatest overall compliance to various vibration components as are met in particular uses of the device.

Although stops or snubbers have been specifically shown only in the form of isolator illustrated in Figs. 2 and 5, it will be understood that similar means may be employed in any of the forms of isolator illustrated to prevent the occurrence of excessive vibrational movements in either a vertical or horizontal direction. Wherever such stops are used, it is preferable to provide the same with strips of rubber, felt, or the like, to provide a yielding snubbing action.

It will be noted that in all the forms of isolator described, there is no direct metal to metal contact between the supported and supporting devices, but in each instance the metallic members, attached to the supported and supporting structures, respectively, are spaced by the rubber blocks. Hence, in no instance are vibrations permitted to pass directly through the metal, and furthermore, the isolators serve as insulation against the transfer of heat by conductance.

The rubber blocks of the vibration isolating devices may be attached to the metal parts in any suitable manner which will give the secure bond required to insure against failure of the devices under extreme conditions of shock or the like. Preferably, however, in each instance the rubber is vulcanized to the metal, as completely satisfactory bonding is obtained by this means which insures against rupture of the devices in the case of accidents, for example, when the devices are employed in railway car construction.

Having thus described my invention in rather full detail, it will be apparent that these details need not be strictly adhered to, but that various changes and modifications will suggest themselves to those skilled in the art, all falling within the scope of the invention as defined by the subjoined claims.

What I claim is:

1. In a railway car or the like, a base structure, a self-sustaining floor in spaced relation thereto, and means arranged at intervals throughout the area of the floor supporting the floor from the base structure, each said means including a body of vibration-isolating material so arranged that relative movements of the floor and base structure stress said body in shear; an inner car wall having its lower edge spaced from said floor, and resilient, readily-compressible means closing the space between said floor and wall.

2. In a railway car or the like, a base structure, a self-sustaining floor in spaced relation thereto, and means arranged at intervals throughout the area of the floor supporting the floor from the base structure, each said means including a body of vibration-isolating material so arranged that the principal strain developed in said block is shear strain, an inner wall for said car having its lower edge spaced from said floor, resilient, readily-compressible means closing the space between the floor and wall, an outer wall structure for said car, and a plurality of means each including a body of vibration-isolating material supporting the inner wall from the outer wall, said last-mentioned body being so arranged that the principal strain developed therein by support of the wall is shear strain.

3. In a railway car or the like, a wall structure, an inner wall, and a plurality of means for supporting said inner wall from said wall structure, each of said means comprising blocks of rubber-like material so arranged that the principal strain developed in said blocks is shear strain, a car floor spaced from the lower edge of said inner wall, and means comprising a resilient, readily-compressible material closing the space between said wall and floor.

4. In a railway car or the like, a frame structure, a floor, and a plurality of means supporting the floor from the frame structure, each said means comprising an element supported from the floor and having a flange extending at an angle to said floor, a second element supported from the frame structure and including a flange extending in spaced, parallel relation to said first-mentioned flange, a block of vibration-isolating material having its opposite faces secured to said spaced, parallel flanges and including longitudinal edges normally free from contact with adjacent portions of said elements, a second block of vibration-isolating material supporting said second element from the frame structure; an inner car wall having its lower edge spaced from the floor, and resilient, readily-compressible means closing the space between said floor and wall.

5. In a railway car or the like, a frame structure, a plurality of members carrying a floor, and a plurality of means supporting the floor carrying members from the frame structure, each said means comprising an angle element having a horizontal flange secured to a floor carrying member and a vertically-extending flange, a second element having a horizontal flange supported from the frame structure and including a vertically-extending flange lying in spaced, substantially parallel relation to said first-mentioned vertical flange, a block of rubber-like material having opposite faces secured to said parallel, spaced flanges and including longitudinal edges normally free from contact with adjacent portions of said elements, a second block of rubber-like material interposed between the frame structure and the horizontal flange of said second element; an inner car wall having its lower edge spaced from said floor, and resilient, readily compressible means closing the space between said floor and wall.

WILLIAM A. JACK, 3RD.